No. 829,200. PATENTED AUG. 21, 1906.
H. C. FRY.
GLASS MELTING POT.
APPLICATION FILED FEB. 8, 1906.
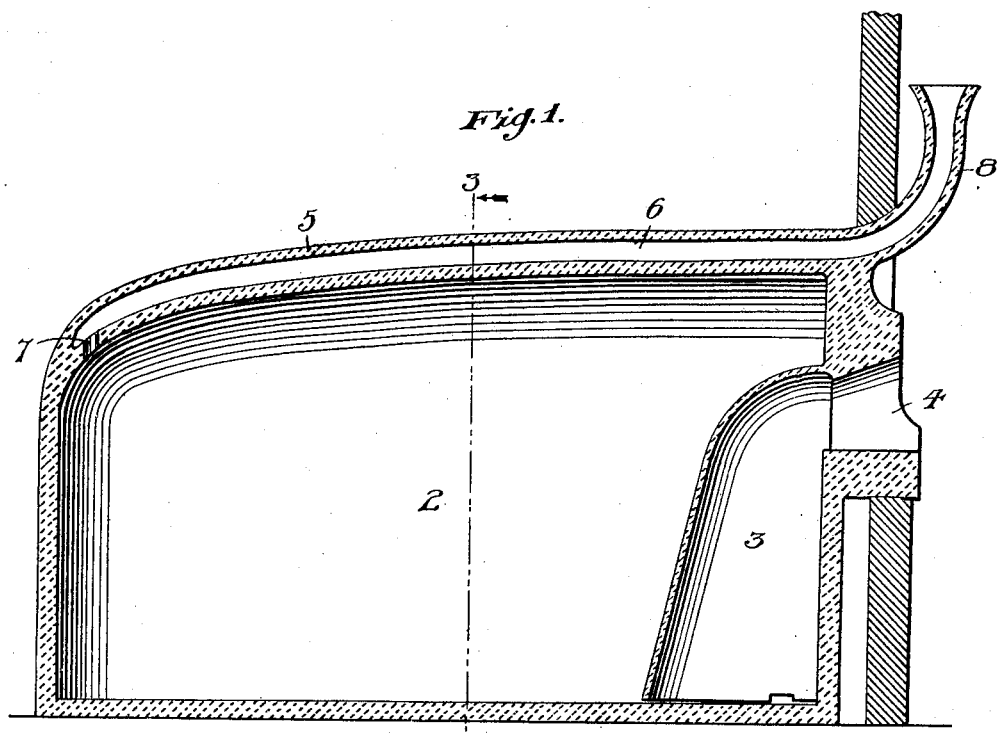
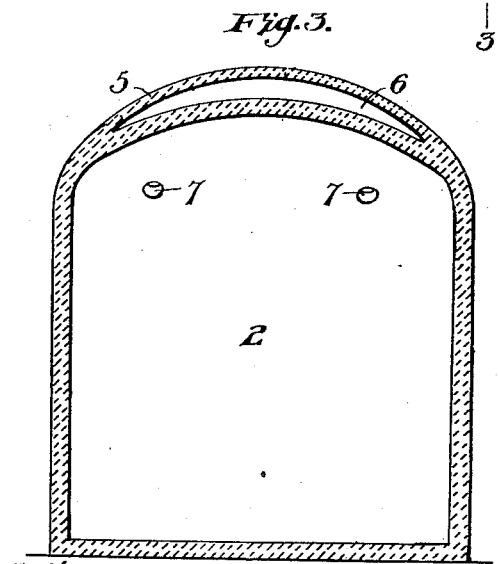 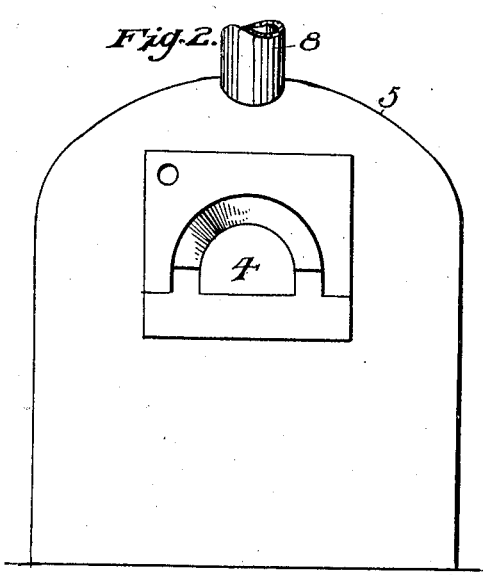

UNITED STATES PATENT OFFICE.

HENRY C. FRY, OF ROCHESTER, PENNSYLVANIA.

GLASS-MELTING POT.

No. 829,200.    Specification of Letters Patent.    Patented Aug. 21, 1906.

Application filed February 8, 1906. Serial No. 300,069.

*To all whom it may concern:*

Be it known that I, HENRY C. FRY, a citizen of the United States, residing at Rochester, in the county of Beaver and State of Pennsylvania, have invented certain new and useful Improvements in Glass-Melting Pots, of which the following is a specification, reference being had therein to the accompanying drawings.

The object of this invention is to provide an improved pot from which glass may be worked continuously, the fusing and refining processes proceeding in such manner that glass is produced of the finest grade and in the best possible condition for working.

As the pot is completely closed to the furnace in which it is heated, the glass is not contaminated by the furnace gases and products; also, with the pot thus closed the gases generated by the fusing process cannot escape into the furnace, thus preserving the brick and other structural parts of the furnace from their destructive action.

In the accompanying drawings, Figure 1 is a longitudinal sectional view of a glass-melting pot constructed in accordance with the invention. Fig. 2 is a front elevation. Fig. 3 is a vertical cross-sectional view on line 3 3 of Fig. 1.

Referring to the drawings, the main portion of the pot is occupied by the melting and refining chamber 2, from the front of which the refined glass is worked, the working-out space being here shown in form of chamber 3, open at its bottom only to chamber 2 for the entrance of the refined glass, the wall forming said chamber extending around working opening 4. The pot is of greater length than width, and the crown 5, curved in cross-section, is of double formation from end to end, and the cavity 6 thus created constitutes a charging and fusing space or chamber, provided at the front and on the exterior of the pot-heating furnace with mouth 8, where the glass-forming materials enter, and at its rear end with openings 7, through which the wholly and partially fused materials discharge into main chamber 2. The crown slopes from front to rear, the inclination being sufficient to cause the materials to pass by gravity through chamber 6 and into chamber 2.

The charging and fusing chamber 6 is wholly above the metal line or level of the pot and being at the top of the pot is exposed to the greatest possible degree of heat, so that as the material flows backward, comparatively slowly, through chamber 6, the fusing, melting, and refining process is well under way before it reaches chamber 2. It is well known that during the fusing process, and especially during the first portion thereof, the materials are agitated quite violently and that such action is quite injurious or at least detrimental when communicated to refined glass or glass ready for working. With my improved pot the most violent portion of this agitation is confined to chamber 6, the melting and fusing being well under way before the materials enter chamber 2, wherein the melting and refining operations are fully completed.

With the charging and fusing chamber above the metal line or level of the main portion of the pot the agitation therein is not communicated to chamber 2 nor to the working chamber, as it would be if all the chambers were in a common plane. The absence of this violent agitation in chamber 2, together with the distance traveled by the glass from end to end of said chamber before being worked, results in the production of the finest and purest possible glass at the point of working.

All portions of the pot interior are closed to the pot-heating furnace, and hence it is impossible for the furnace gases and products to enter and pollute the glass. Conversely, the brick and other structural work of the furnace is protected from the destructive action of the gases generated by the fusing and refining process.

I claim—

1. A glass-melting pot having a hollow wall above the metal line of the pot to form a charging and fusing chamber, said chamber being open only to the pot interior and to the exterior of the pot-heating furnace.

2. A glass-melting pot constructed with a hollow crown above the metal line of the pot to form a charging and fusing chamber, the crown-cavity being open only to the pot interior and to the exterior of the pot-heating furnace.

3. A glass-melting pot constructed with a hollow crown to form a charging and fusing chamber, said chamber extending from front to rear of the pot above the metal line thereof and open at its rear to the pot interior and at its front to the exterior of the pot-heating furnace.

4. A glass-melting pot wholly closed to the furnace in which it is heated, the pot-crown being hollow above the metal line to form a charging and fusing chamber, said chamber sloping downwardly from front to rear with its lower rear end communicating with the pot interior and its front or upper end open to the exterior of the pot-heating furnace.

5. A glass-melting pot having a working chamber in its front and a working mouth communicating therewith, a refining-chamber at the rear of the working chamber, and a charging and fusing chamber above the refining-chamber and open only thereto and to the exterior of the pot-heating furnace.

6. A glass-melting pot having a working chamber at the front provided with a working mouth, a refining-chamber at the rear of the working chamber, and a charging and fusing chamber above and extending longitudinally of the pot from front to rear, the charging-chamber being wholly closed to the pot-heating furnace but open to the exterior thereof, the rear portion of the charging-chamber being open to the refining-chamber.

7. A glass-melting pot having a working chamber in the front provided with a working mouth, a refining-chamber at the rear of and communicating with the working chamber, the pot-crown being hollow from front to rear to form a charging and fusing chamber which at the rear communicates with the refining-chamber and at the front is open to the exterior of the pot-heating furnace.

In testimony whereof I affix my signature in presence of two witnesses.

HENRY C. FRY.

Witnesses:
   J. M. NESBIT,
   MARGARET HUGHES.